(12) United States Patent
Morhain et al.

(10) Patent No.: US 12,551,855 B2
(45) Date of Patent: Feb. 17, 2026

(54) CONTAINER FOR DIFFUSING VOLATILE SUBSTANCES

(71) Applicant: ZOBELE HOLDING SPA, Trento (IT)

(72) Inventors: Cedric Morhain, Barcelona (ES); Stefano Deflorian, Trento (IT)

(73) Assignee: ZOBELE HOLDING SPA, Trento (IT)

( * ) Notice: Subject to any disclaimer, the term of this patent is extended or adjusted under 35 U.S.C. 154(b) by 321 days.

(21) Appl. No.: 18/267,706

(22) PCT Filed: Dec. 17, 2021

(86) PCT No.: PCT/EP2021/086469
§ 371 (c)(1),
(2) Date: Jun. 15, 2023

(87) PCT Pub. No.: WO2022/129510
PCT Pub. Date: Jun. 23, 2022

(65) Prior Publication Data
US 2024/0009632 A1   Jan. 11, 2024

(30) Foreign Application Priority Data

Dec. 17, 2020   (EP) .................................... 20215028

(51) Int. Cl.
*B01D 53/02*   (2006.01)
*A61L 9/12*   (2006.01)
(Continued)

(52) U.S. Cl.
CPC ................ *B01D 71/26* (2013.01); *A61L 9/12* (2013.01); *B01D 19/0031* (2013.01);
(Continued)

(58) Field of Classification Search
CPC .. A61L 2209/13; A61L 2209/131; A61L 9/12; B01D 19/0031; B01D 2325/08; B01D 69/02; B01D 71/26
See application file for complete search history.

(56) References Cited

U.S. PATENT DOCUMENTS 4,614,299 A * 9/1986 Van Loveren ...... A01M 1/2055
239/6
5,497,942 A * 3/1996 Zingle ..................... A61L 9/042
428/905

(Continued)

FOREIGN PATENT DOCUMENTS

EP   0194859 A2   9/1986
EP   0194859 A3   9/1986
(Continued)

OTHER PUBLICATIONS

International Search Report and Written Opinion issued for PCT/EP2021/086469; mailed Jun. 23, 2022.

*Primary Examiner* — Christopher P Jones
(74) *Attorney, Agent, or Firm* — Kutak Rock LLP

(57) ABSTRACT

The container for diffusing volatile substances comprises a transparent container body (1) for a material impregnated with volatile substances and provided with an opening (2); a permeable membrane (3) that closes the opening (2) of the container body (1); and a barrier layer (4) removably connected to the permeable membrane (3); wherein the permeable membrane (3) is sealed with the container body (1) in a sealing zone (6), the permeable membrane (3) being transparent in the sealing zone (6).

It permits to provide a container for diffusing volatile substances with an improved or high-performance membrane that allows at first sight to see that the sealing of the container is correct.

14 Claims, 3 Drawing Sheets

(51) Int. Cl.
  *B01D 19/00* (2006.01)
  *B01D 69/02* (2006.01)
  *B01D 71/26* (2006.01)
(52) U.S. Cl.
  CPC ........ *B01D 69/02* (2013.01); *A61L 2209/131* (2013.01); *B01D 2325/08* (2013.01)

(56) References Cited

U.S. PATENT DOCUMENTS

| | | |
|---|---|---|
| 2003/0089791 A1 | 5/2003 | Chen et al. |
| 2009/0162253 A1* | 6/2009 | Porchia ............... A61L 9/02 422/124 |
| 2010/0178042 A1* | 7/2010 | Neumann ............. F24F 11/00 392/386 |
| 2010/0264232 A1* | 10/2010 | Gruenbacher ....... B60H 3/0028 239/6 |
| 2010/0308126 A1* | 12/2010 | Gruenbacher ........... A61L 9/04 239/6 |
| 2014/0048614 A1* | 2/2014 | Santini ................... A61P 35/00 239/34 |
| 2014/0209698 A1* | 7/2014 | Olchovy .................. A61L 9/12 239/6 |
| 2014/0369895 A1* | 12/2014 | Turner ................. A01M 1/2033 422/124 |
| 2018/0104372 A1 | 4/2018 | Mcglade |
| 2018/0161470 A1 | 6/2018 | Zobele |

FOREIGN PATENT DOCUMENTS

| | | |
|---|---|---|
| WO | 2015076780 A1 | 5/2015 |
| WO | 2022129510 A1 | 6/2022 |

* cited by examiner

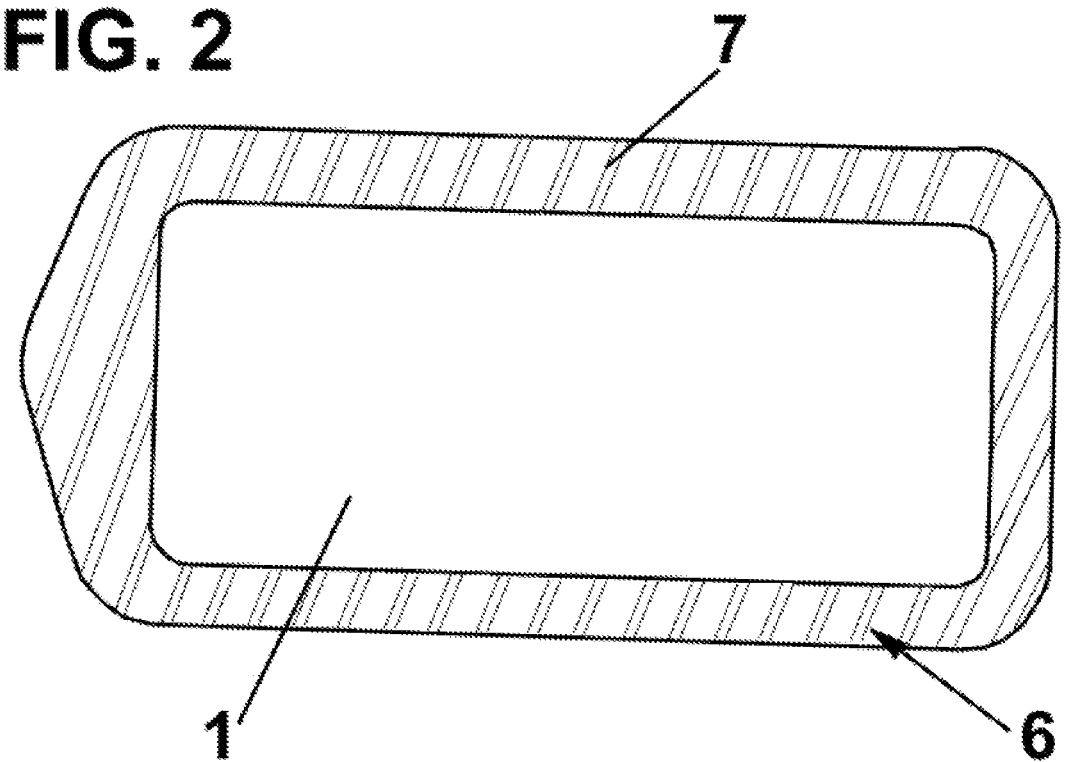

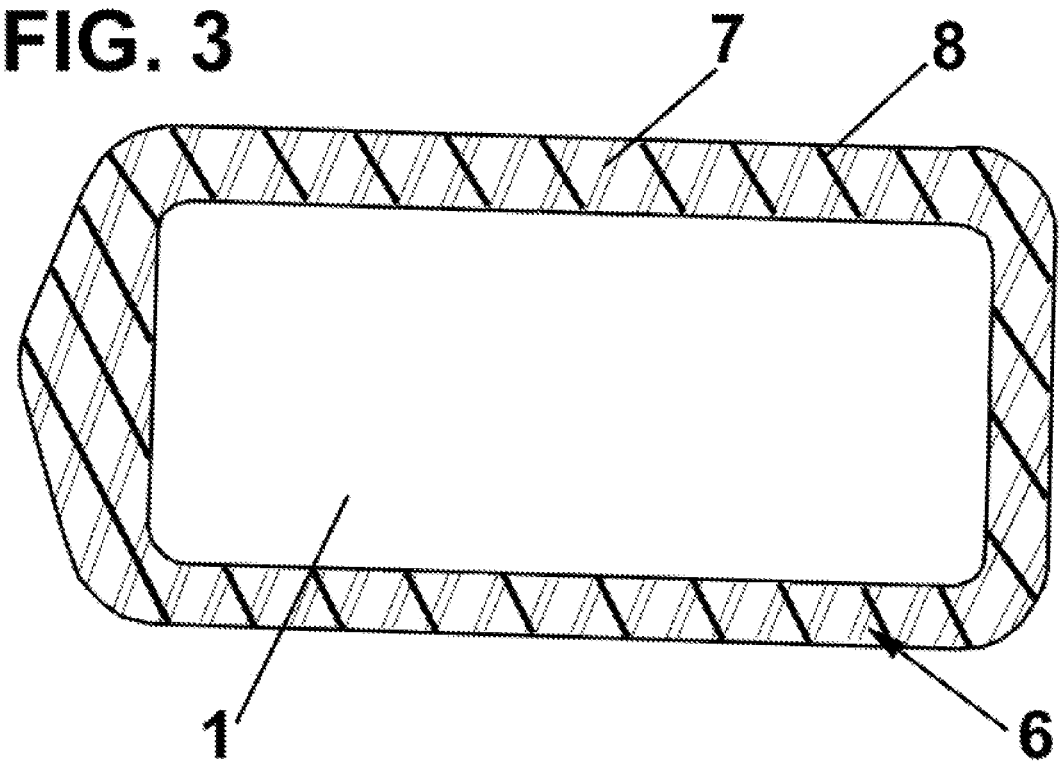

CONTAINER FOR DIFFUSING VOLATILE SUBSTANCES

This is the United States National Stage of Patent Cooperation Treaty Application No. PCT/EP2021/086469, filed Dec. 17, 2021, which claims priority to European Patent Application No. 20215028.0 filed Dec. 17, 2020, the entire disclosures of which are incorporated herein by reference.

The present invention relates to a container for diffusing volatile substances.

BACKGROUND OF THE INVENTION

The use of standard polyolefin monolithic membranes (polyethylene or polypropylene, generally) has been known for years for releasing or diffusing volatile substances, such as fragrances.

This diffusion of volatile substances is carried out using a container, often made by thermoforming, which is closed by said membrane, to let the volatile substances pass, but not liquids. A barrier layer is applied on this membrane, which prevents volatile substances from diffusing during storage and must be removed by the user before a first use.

Due to the limitation of these diffusers in terms of the evaporation quality of the volatile substances and their intensity, a large number of alternatives have appeared with a much more complex structure: a microporous layer, or multilayer with non-woven fabric, where the sealing could be capillary if you do not pay special attention.

In fact, while a standard monolithic system cannot transport the volatile substances through the seal because the length to be crossed is too high, with a porous construction this length is no longer an obstacle.

Therefore, it is important that the sealing not only guarantees the adhesion of the membrane on the thermoformed container, but also guarantees the elimination of the porous microstructure of the membrane in that area.

In standard diffusers, the union of the membrane with the container is basically about achieving good adhesion between the two materials with a more complex structure. However, this is not enough, as all capillarity needs to be removed so that no lost volatile substances remain before removing the top barrier layer.

DISCLOSURE OF THE INVENTION

Therefore, an object of the present invention is to provide a container for diffusing volatile substances with an improved or high-performance membrane that allows at first sight to see that the sealing of the container is correct.

With the container for diffusing volatile substances of the invention said disadvantages are solved, presenting other advantages that will be described below.

The container for diffusing volatile substances according to the present invention is defined in claim 1, and it comprises:
- a transparent container body for a material impregnated with volatile substances and provided with an opening;
- a thermoplastic permeable membrane that closes the opening of the container body; and
- a barrier layer removably connected to the permeable membrane;

wherein the permeable membrane is sealed to the container body in a sealing zone, the permeable membrane being transparent in the sealing zone and opaque outside the sealing zone.

By permeable membrane is meant a monolayer or multilayer membrane where the layer or one of the layers is composed of a material with a certain porosity. This includes microporous membranes themselves, but also fibrous non-woven materials.

It should be noted that the permeable membrane is transparent in the sealing zone because there is no pore between the permeable membrane and the container body in this zone, the sealing being of high quality. Furthermore, said permeable membrane is opaque when it is not sealed or impregnated with the material with the volatile substances.

The permeable membrane is made from a thermoplastic material, and it melts when heat is applied.

Therefore, the permeable membrane comprises pores and it is opaque when no heat is applied, and its opacity is due to the presence of the pores that diffract light. When the thermoplastic material is melted during sealing, applying heat on the sealing zone, the pores are destroyed, and with no pores, the permeable membrane is transparent.

This way, it is easy to see if the container is well sealed or not, since if it is well sealed the barrier layer will be perfectly visible through the permeable membrane in the sealing zone, and if it is not well sealed, the Barrier layer will not show clear or defined through permeable membrane in the sealing zone.

Preferably, in the sealing zone, the permeable membrane has a light transmission greater than 70%, ideally greater than 90%, and a diffraction angle of less than 30°.

Preferably, the sealing zone is a zone of the perimeter of the permeable membrane and the container.

According to a preferred embodiment, the permeable membrane and/or the barrier layer comprise an embossed pattern in the sealing zone, which makes it easy to see whether the sealing is correct or not.

According to one embodiment, the barrier layer may comprise a pattern printed in the sealing zone, which also makes it easy to see whether the sealing is correct or not.

Advantageously, the permeable membrane is a microporous membrane, for example made of polyolefin, and the barrier layer is made of aluminum.

BRIEF DESCRIPTION OF THE DRAWINGS

For better understanding of what has been disclosed, some drawings in which, schematically and only by way of a non-limiting example, a practical case of embodiment is shown.

FIG. 2 is a plan view of the container according to the present invention, according to a first embodiment; and FIG. 3 is a plan view of the container according to the present invention, according to a second embodiment.

DESCRIPTION OF PREFERRED EMBODIMENTS

Figure 1:
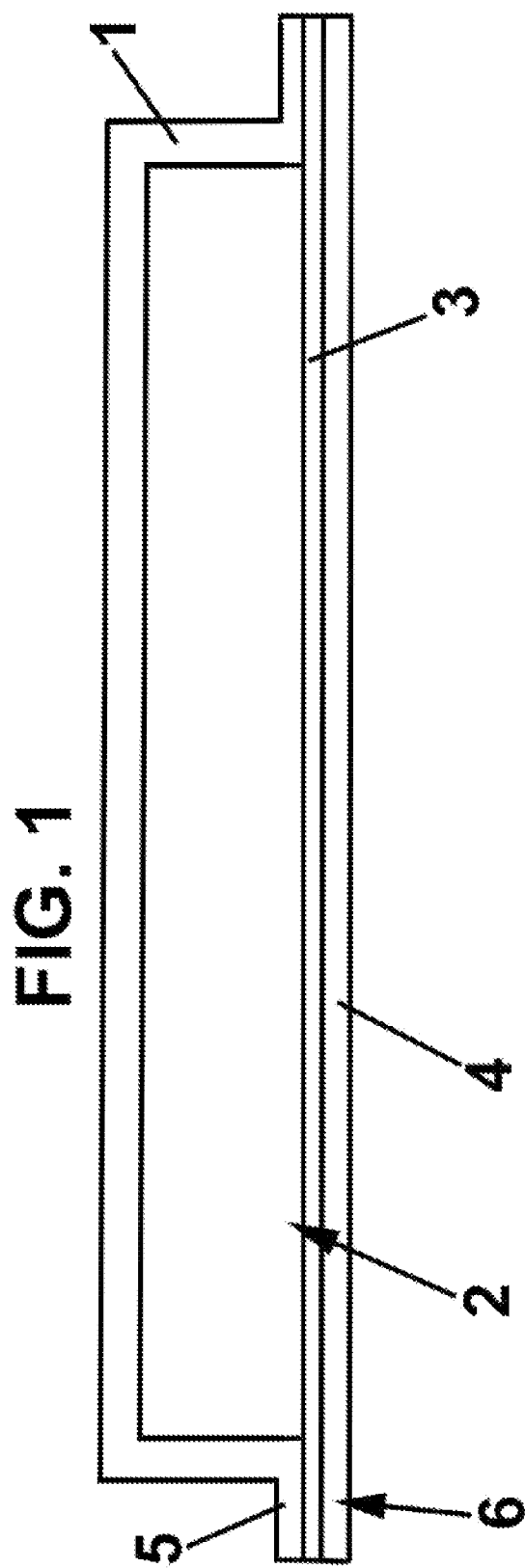
FIG. 1 is a sectional elevation view of the container according to the present invention.

As shown in FIG. 1, the container for diffusing volatile substances comprises a transparent container body 1 for containing a material impregnated with volatile substances (not shown in the figure).

This container body 1 comprises an opening 2 which is closed by a permeable membrane 3 and a barrier layer 4.

This permeable membrane 3 allows the diffusion of volatile substances through it but prevents the escape of possible liquids inside the container body 1.

On the other hand, the barrier layer 4 prevents the diffusion of volatile substances into the environment, so it must be removed before the first use. To this end, the barrier layer 4 is removably connected to the permeable membrane 3.

According to a non-limiting embodiment, the permeable membrane 3 can be made of a microporous polyolefin, while the barrier layer 4 can be made of aluminum.

As can be seen in FIG. 1, the container body 1 comprises a perimeter rim 5 that surrounds the opening 2 and is where the permeable membrane 3 and the barrier layer 4 are attached to the container body 1.

On the other hand, the permeable membrane 3 and the container body 1 are sealed together in a sealing zone 6, which is preferably the perimeter contact zone between the permeable membrane 3 and the container body 1.

The sealing between the permeable membrane 3 and the container body 1 is carried out without pores remaining between them in the sealing zone 6, and in such a way that the permeable membrane 3 is transparent in this sealing zone 6 and opaque outside said sealing zone 6. Thus, the barrier layer 4 can be seen through the permeable membrane 3 in the sealing zone 6.

Advantageously, the light transmission of the permeable membrane 3 in the sealing zone 6 is greater than 70% and/or the diffraction angle of the permeable membrane 3 is less than 30°.

If the sealing is correct, the permeable membrane 3 will be transparent in the sealing zone 6 and this correct sealing can easily be verified, since otherwise the barrier layer 4 will not be seen clear in this sealing zone 6.

To facilitate the verification that the sealing is correct, the permeable membrane 3 and/or the barrier layer 4 may comprise an embossed pattern 7 in the sealing zone 6, as shown in FIG. 2.

Furthermore, the barrier layer 4 may comprise a pattern 8 printed in the sealing zone 6, for example, lines parallel to each other, which also makes it easier to see whether the sealing is correct or not.

This way, before a first use, the manufacturer or the user will be able to check whether the container for the diffusion of volatile substances according to the present invention is properly sealed, and for its use he/she will simply have to remove the barrier layer 4. For the manufacturer it is especially important to check that the process has been correct and a defective container that could reach the consumer half empty is not going to be sent.

Although reference has been made to specific embodiments of the invention, it is apparent to a person skilled in the art that the disclosed container for diffusing volatile substances is susceptible of numerous variations and modifications, and that all the details mentioned can be replaced by other technically equivalents, without departing from the scope of protection defined by the appended claims.

The invention claimed is:

1. Container for diffusing volatile substances, comprising:
a transparent container body (1) for a material impregnated with volatile substances and provided with an opening (2);
a porous permeable membrane (3) made from a thermoplastic material that closes the opening (2) of the container body (1); and
a barrier layer (4) removably connected to the permeable membrane (3);
characterized in that the permeable membrane (3) is sealed with the container body (1) in a sealing zone (6), the permeable membrane (3) being transparent in the sealing zone (6) and opaque outside the sealing zone (6).

2. Container for diffusing volatile substances according to claim 1, wherein the light transmission of the permeable membrane (3) in the sealing zone (6) is greater than 70% and/or the diffraction angle of the permeable membrane (3) is less than 30°.

3. Container for diffusing volatile substances according to claim 1, wherein the sealing zone (6) is a zone of the perimeter of the permeable membrane (3) and the container body (1).

4. Container for diffusing volatile substances according to claim 1, wherein the permeable membrane (3) and/or the barrier layer (4) comprise a relief pattern (7) in the sealing zone (6).

5. Container for diffusing volatile substances according to claim 1, wherein the permeable membrane (3) is a microporous membrane.

6. Container for diffusing volatile substances according to claim 1, wherein the barrier layer (4) is made of aluminum.

7. Container for diffusing volatile substances according to claim 1, wherein the permeable membrane (3) is made of polyolefin.

8. Container for diffusing volatile substances according to claim 2, wherein the permeable membrane (3) and/or the barrier layer (4) comprise a relief pattern (7) in the sealing zone (6).

9. Container for diffusing volatile substances according to claim 2, wherein the permeable membrane (3) is a microporous membrane.

10. Container for diffusing volatile substances according to claim 3, wherein the permeable membrane (3) is a microporous membrane.

11. Container for diffusing volatile substances according to claim 4, wherein the permeable membrane (3) is a microporous membrane.

12. Container for diffusing volatile substances according to claim 2, wherein the barrier layer (4) is made of aluminum.

13. Container for diffusing volatile substances according to claim 3, wherein the barrier layer (4) is made of aluminum.

14. Container for diffusing volatile substances according to claim 4, wherein the barrier layer (4) is made of aluminum.

* * * * *